US012145440B2

(12) United States Patent
Clark et al.

(10) Patent No.: US 12,145,440 B2
(45) Date of Patent: Nov. 19, 2024

(54) PEDAL-SUPPORTED FRICTION DEVICE

(71) Applicant: CTS Corporation, Lisle, IL (US)

(72) Inventors: John Clark, Granger, IN (US); James M. Post, Granger, IN (US); Brandon D. Elek, Osceola, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 17/936,910

(22) Filed: Sep. 30, 2022

(65) Prior Publication Data

US 2024/0109411 A1 Apr. 4, 2024

(51) Int. Cl.
*B60K 26/02* (2006.01)
*B60K 26/04* (2006.01)
*G05G 1/38* (2008.04)
*G05G 1/44* (2008.04)
*G05G 5/05* (2006.01)

(52) U.S. Cl.
CPC ............. *B60K 26/02* (2013.01); *B60K 26/04* (2013.01); *G05G 1/38* (2013.01); *G05G 1/44* (2013.01); *G05G 5/05* (2013.01); *G05G 2505/00* (2013.01)

(58) Field of Classification Search
CPC ................................................. G05G 2505/00
See application file for complete search history.

(56) References Cited

U.S. PATENT DOCUMENTS

| | | | |
|---|---|---|---|
| 6,515,473 B2 | 2/2003 | Pfaffenberger et al. | |
| 8,011,270 B2 * | 9/2011 | Schlabach | G05G 1/38 |
| | | | 74/513 |
| 8,042,430 B2 * | 10/2011 | Campbell | G05G 1/38 |
| | | | 74/513 |
| 11,307,606 B2 | 4/2022 | Byrd et al. | |
| 2018/0052483 A1 * | 2/2018 | Brown | B60W 10/02 |
| 2019/0361480 A1 * | 11/2019 | Kim | G05G 5/03 |

FOREIGN PATENT DOCUMENTS

DE 102021104727 A1 9/2022

OTHER PUBLICATIONS

International Search Report and Written Opinion for Application No. PCT/US2023/072793, dated Dec. 15, 2023 (13 pages).

\* cited by examiner

*Primary Examiner* — Vicky A Johnson
(74) *Attorney, Agent, or Firm* — Michael Best & Friedrich LLP

(57) ABSTRACT

A vehicular pedal assembly includes a pedal housing with a mounting surface on a forward side for securement within a vehicle. A rotatable pedal has a proximal portion positioned in the pedal housing and a distal portion including a foot pad spaced from the pedal housing. The pedal is biased to a first limit position with respect to the pedal housing, and the distal portion is configured to be actuated from the first limit position in a forward direction. A friction system is provided for generating a resistance force against movement of the pedal toward and away from the first limit position. The friction system includes a friction lever having a friction pad, the friction lever being carried by the pedal and pivotable on the pedal to establish friction contact with a friction contact surface of the pedal housing.

20 Claims, 10 Drawing Sheets

PEDAL-SUPPORTED FRICTION DEVICE

BACKGROUND

The present invention relates to pedal assemblies, for example in a vehicle where the user controls throttle, brake, and optionally clutch by foot. Such pedals, particularly throttle pedals, may include a variable friction device so that the user is not required to constantly present a holding force equal to a spring bias force during sustained pedal actuation. For this purpose, a friction lever may be supported on a housing of the pedal assembly and engageable with a portion of the pedal to supply frictional resistance to movement.

SUMMARY

In one aspect, the invention provides a vehicular pedal assembly. A pedal housing includes a mounting surface on a forward side for securement within a vehicle. A rotatable pedal has a proximal portion positioned in the pedal housing and a distal portion including a foot pad spaced from the pedal housing. The pedal is biased to a first limit position with respect to the pedal housing, and the distal portion is configured to be actuated from the first limit position in a forward direction. A friction system is provided for generating a resistance force against movement of the pedal toward and away from the first limit position. The friction system includes a friction lever having a friction pad, the friction lever being carried by the pedal and pivotable on the pedal to establish friction contact with a friction contact surface of the pedal housing.

In another aspect, the invention provides an accelerator pedal assembly including a mounting surface for securement within a vehicle, and an accelerator pedal including a foot pad. The accelerator pedal is biased by a spring to a first limit position with respect to the mounting surface, and the foot pad is configured to be actuated from the first limit position in a forward direction. A friction system is provided for generating a resistance force against movement of the accelerator pedal toward and away from the first limit position. The friction system includes a friction lever pivotally supported on the accelerator pedal. The spring applies a force to the friction lever such that the resistance force changes according to the deflection of the spring.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
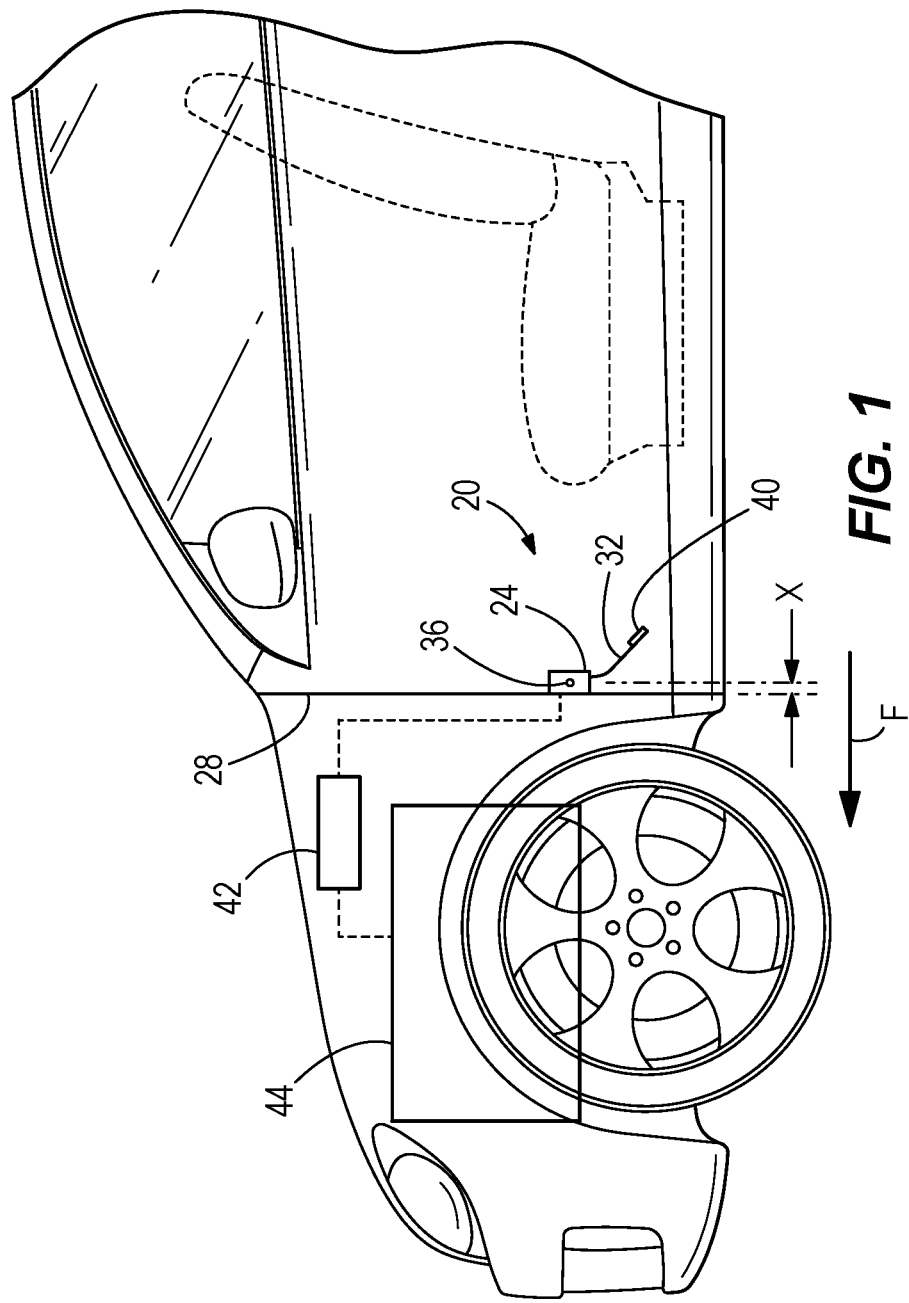
FIG. 1 is a schematic view of a vehicular pedal assembly mounted to a vehicle bulkhead.

FIG. 1 illustrates a vehicle including a pedal assembly 20 positioned for use by a driver of the vehicle to control the travel of the vehicle. In one construction, the pedal assembly 20 is an accelerator pedal assembly. The pedal assembly 20 can include a housing 24 configured to mount to a vehicle bulkhead 28 (or "firewall"). A pedal arm, or simply "pedal" 32 extends from the housing 24 in which it is supported at a pivot 36. A distal portion of the pedal 32 can be provided with a foot pad or footrest 40 for contact by the driver's foot. In some constructions, the pedal assembly 20 is a pedal and sensor assembly having an integrated position sensor for tracking the position of the pedal 32. The pedal assembly 20 can be connected for signal communication with an electronic control module (ECM) 42 of the vehicle for controlling power output from a prime mover 44 (e.g., internal combustion engine, hybrid, or full electric motor). The pedal assembly 20 includes a friction system, described in greater detail below, for generating a variable friction force resisting movement of the pedal 32 with respect to the housing 24, and thus damping movements of the pedal 32 and reducing driver fatigue. Friction systems are known in the prior art, including for example, U.S. Pat. No. 6,515,473 or more recently U.S. Pat. No. 11,307,606, the entire contents of both of which are incorporated by reference herein. However, constraints in packaging and weight reduction for mass produced automobiles have made it increasingly difficult to meet design targets with such prior art devices. For example, more recently, it is desired to set the offset distance X between the bulkhead 28 and the pivot 36 of the pedal 32 very low, thus reducing the available space in the housing 24. Where conventional designs may already have a relatively small offset distance (e.g., approximately 27 mm), a substantial further reduction in excess of 5 percent or 7 percent can make it entirely prohibitive to meet design goals through further miniaturization of a conventional layout, thus requiring a completely new approach.

Figure 2:
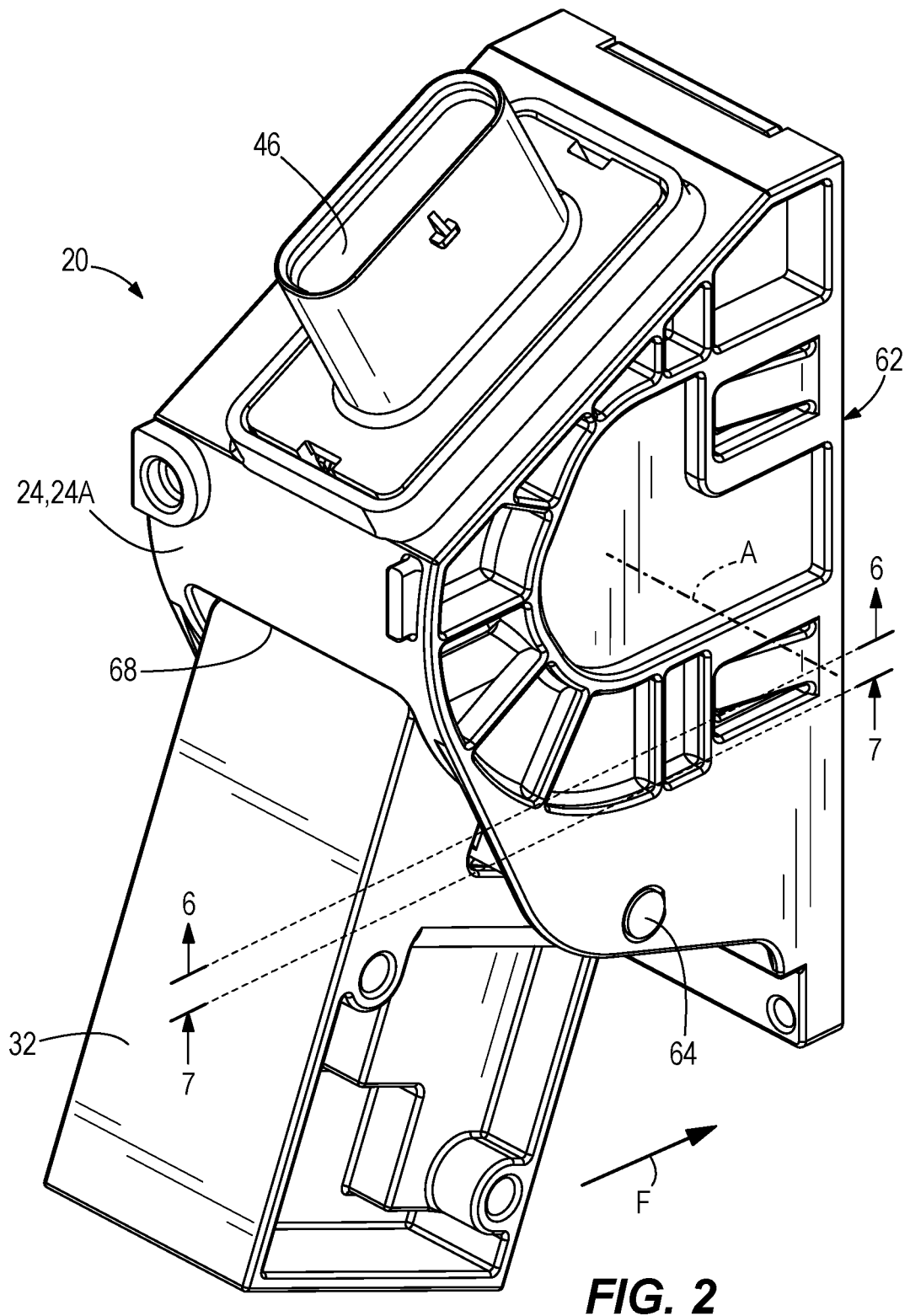
FIG. 2 is a perspective view of the pedal assembly according to one embodiment of the present disclosure, including a pedal-supported friction device.
Figure 4:
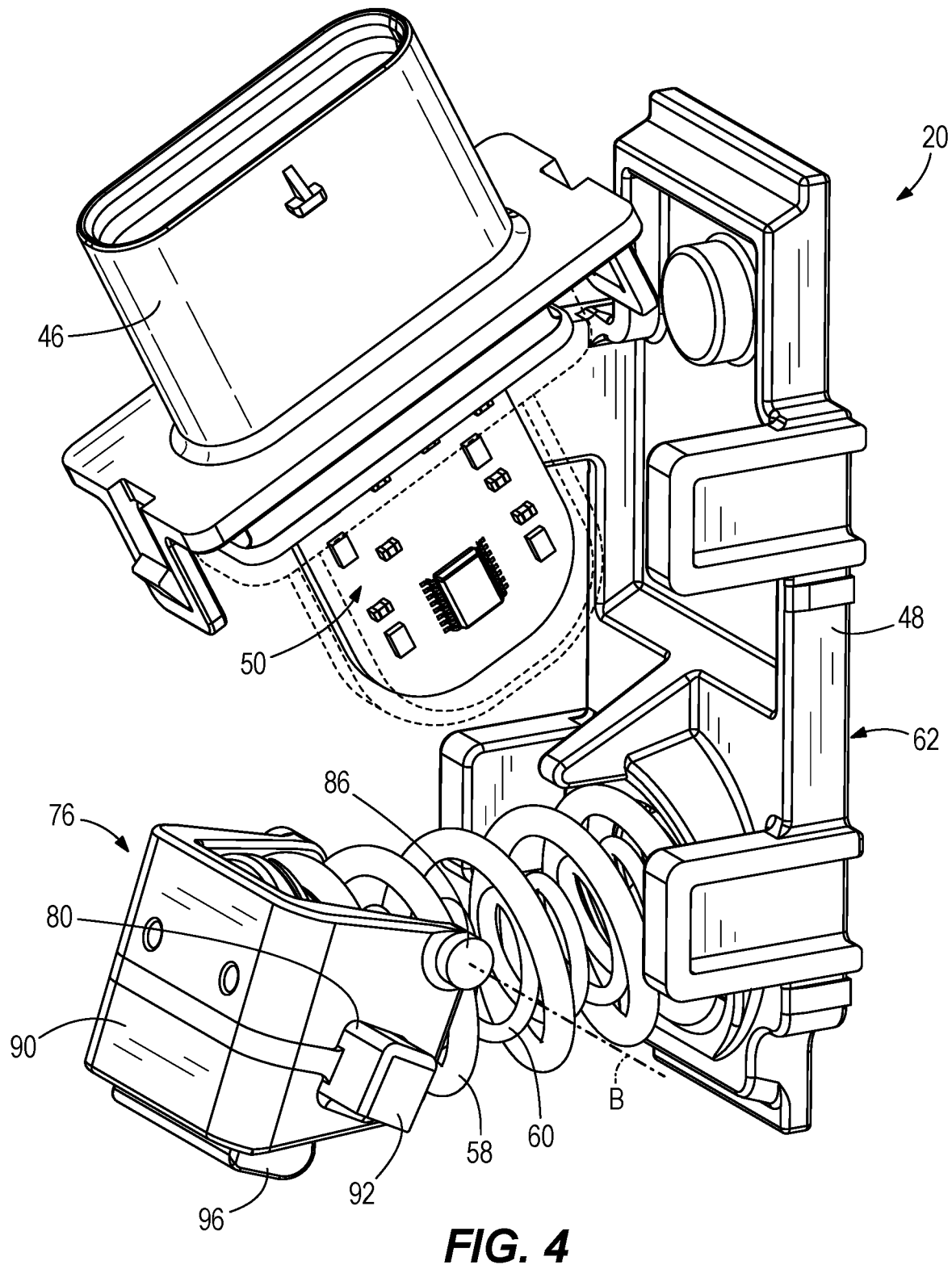
FIG. 4 is a perspective view of the pedal assembly of FIG. 2 in which the housing and a pedal are removed to reveal internal components.
Figure 5:
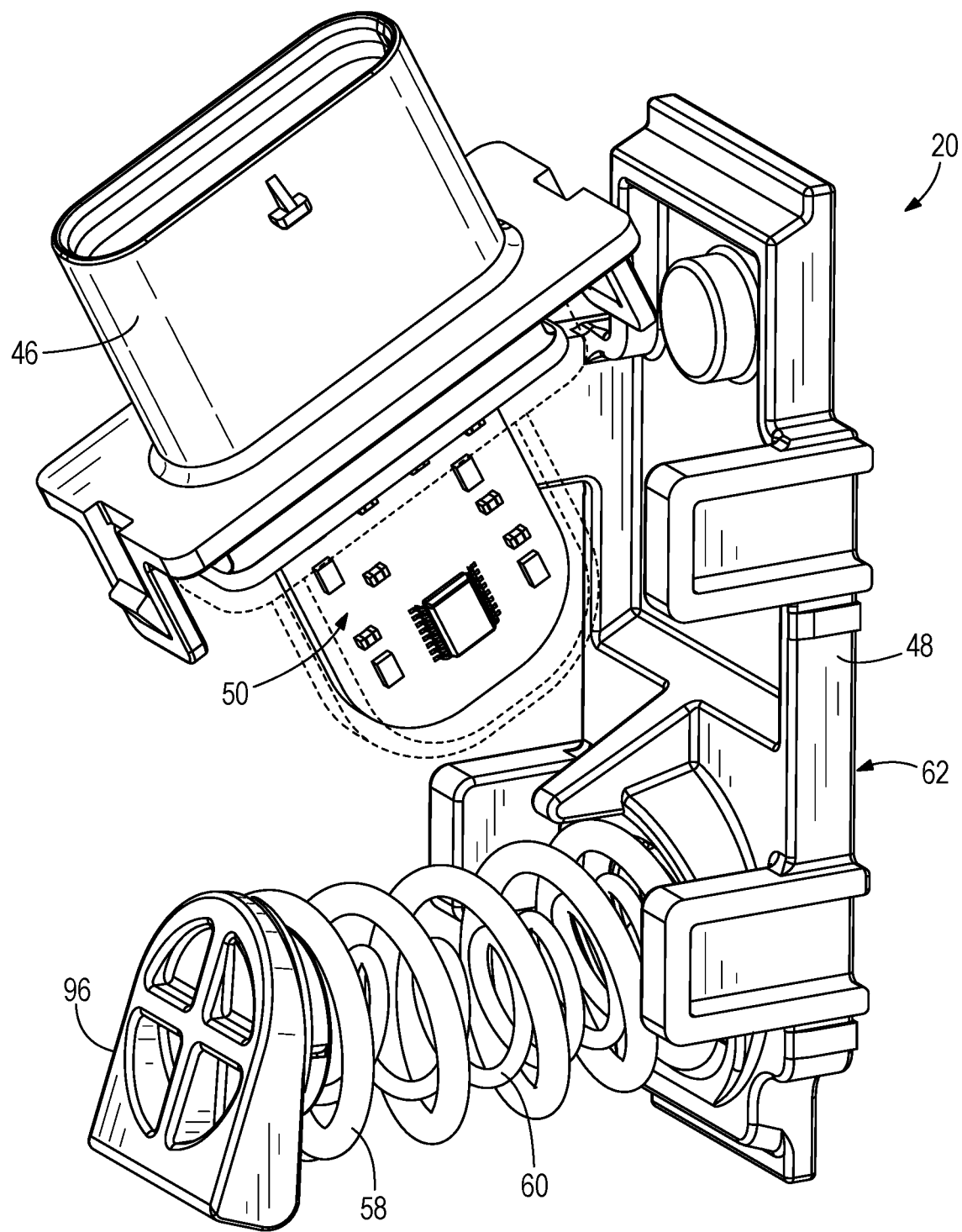
FIG. 5 is a perspective view of the pedal assembly as shown in FIG. 4, but with a friction lever also removed.

FIG. 2 illustrates the pedal assembly 20 in isolation, where only a portion of the pedal arm 32 that is proximal to the housing 24 is shown, with the understanding that the pedal 32 extends further in the downward direction of the view toward the foot pad 40. The pivot 36, which defines the axis A of rotation for the pedal 32, can be seen in FIG. 3 where the housing 24 is at least partially removed, and also in FIG. 9. The pivot 36 can be constructed with one or more bearings, e.g., a plain bearing with concentric bearing surfaces. Signal communication with the ECM 42 is provided through the electrical connector 46. The electrical connector 46 can be a plug/socket type multi-pin connector including an outer shroud that projects outward from a main portion 24A of the housing 24 (e.g., generally in an opposite direction from the pedal 32). A wire harness connector (not shown) can plug into the electrical connector 46. The electrical connector 46 can provide a portion of the housing 24 when coupled (e.g., snap fit) to the main housing portion 24A. Likewise, a plate or closure member 48 can be coupled (e.g., snap fit) to the housing main portion 24A to also form part of the housing 24. The housing main portion 24A, the closure member 48, and the electrical connector 46 can combine to form the housing 24, within which a position sensor module 50 coupled to the electrical connector 46 is provided. The position sensor module 50 can include a non-contact type sensor (e.g., Hall-effect magnetic sensor), and can be incorporated with an integrated circuit on a printed circuit board as shown in FIGS. 4 and 5. In other constructions, any suitable and readily available sensor topology can be used. The movement of the pedal 32 can be tracked by the position sensor module 50 throughout a range of available movement. For use with a Hall-effect sensor, a magnet 54 can be secured to the pedal 32 in a position adjacent the position sensor module 50. When the pedal 32 is moved, the magnet 54 moves across the position sensor module 50, and the magnetic field change is detected in order to precisely track the position of the pedal 32.

Figure 3:
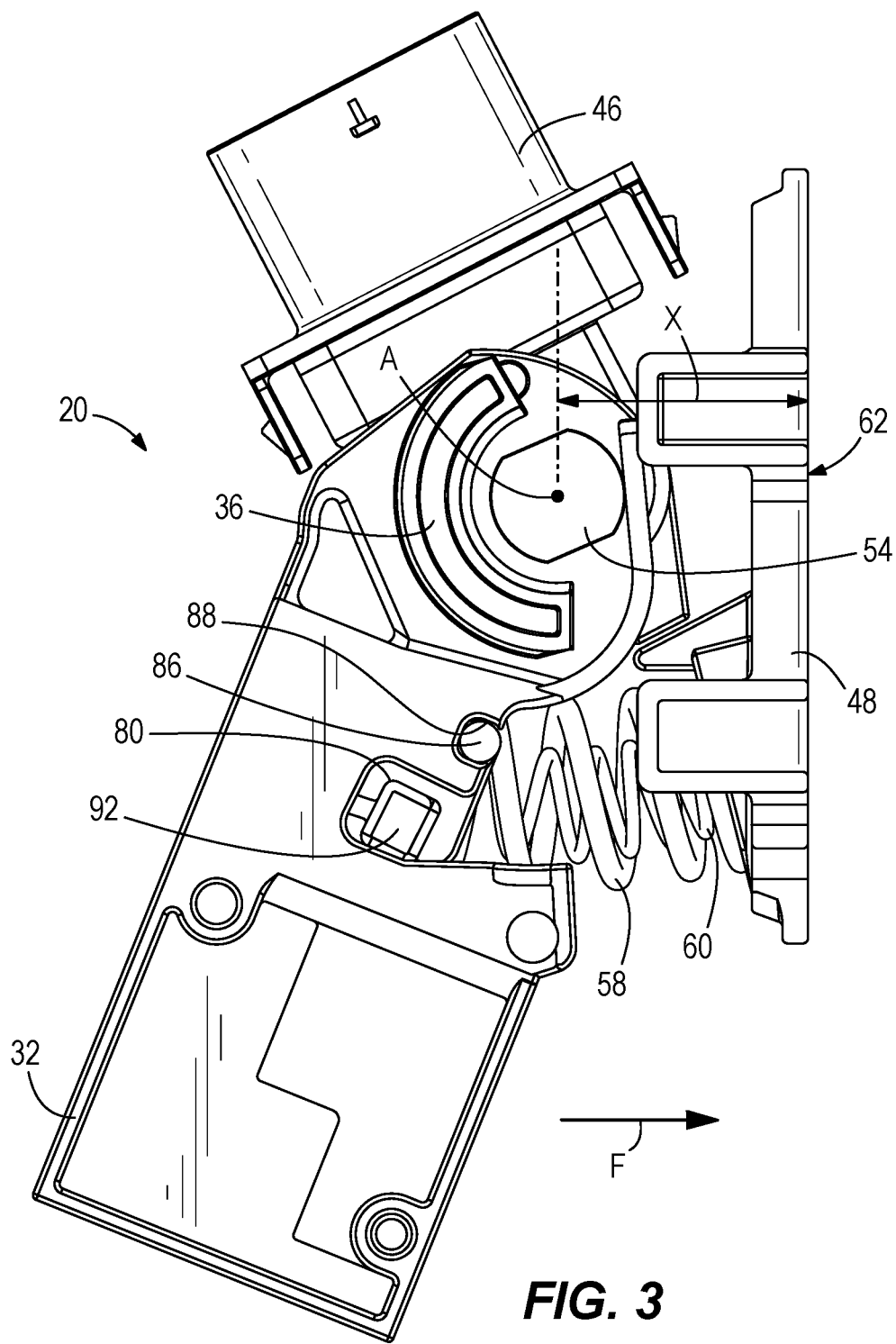
FIG. 3 is a side elevation view of the pedal assembly of FIG. 2 in which a housing is removed to reveal internal components.
Figure 6:
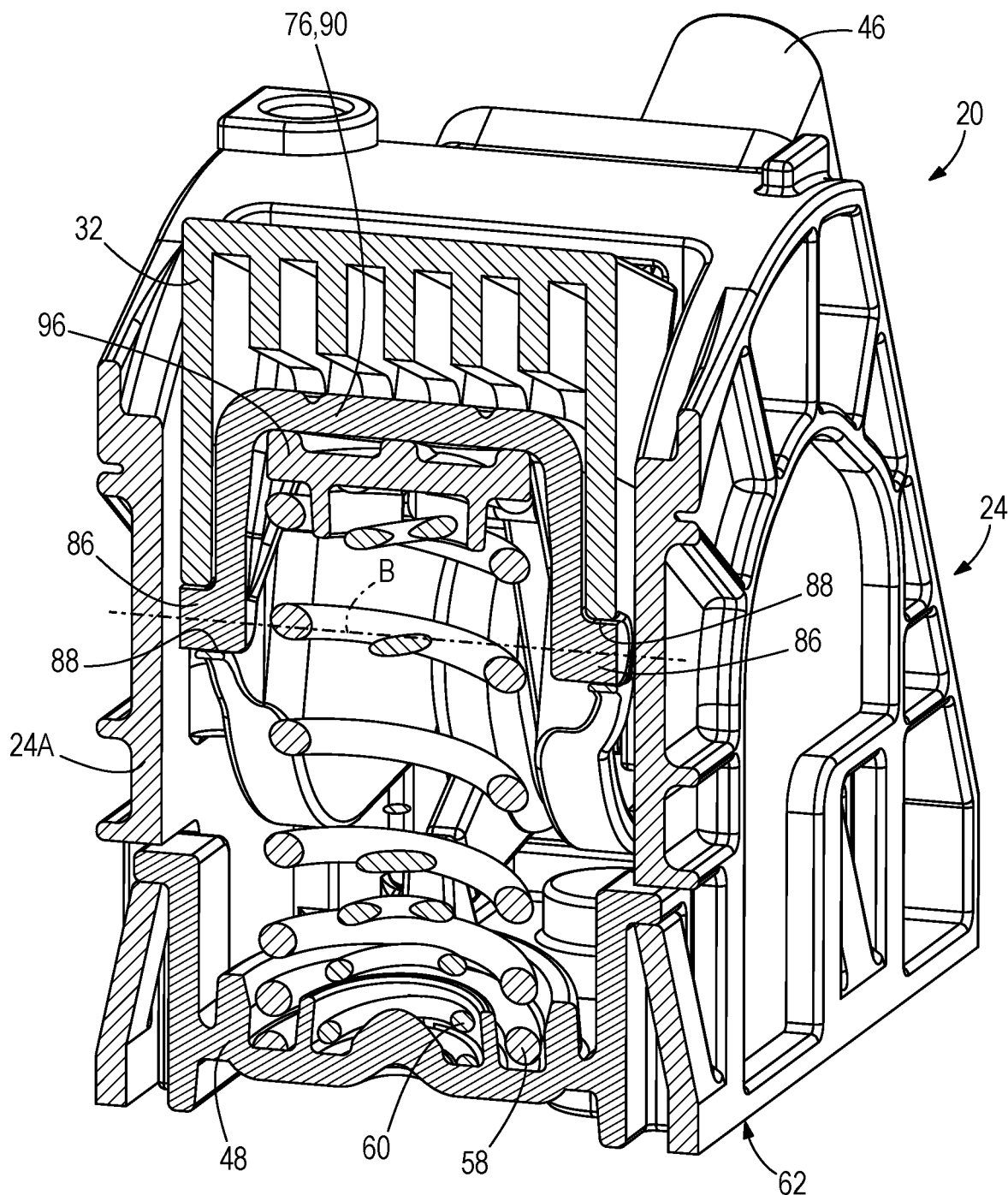
FIG. 6 is a cross-section view of the pedal assembly, taken along line 6-6 of FIG. 2.
Figure 7:
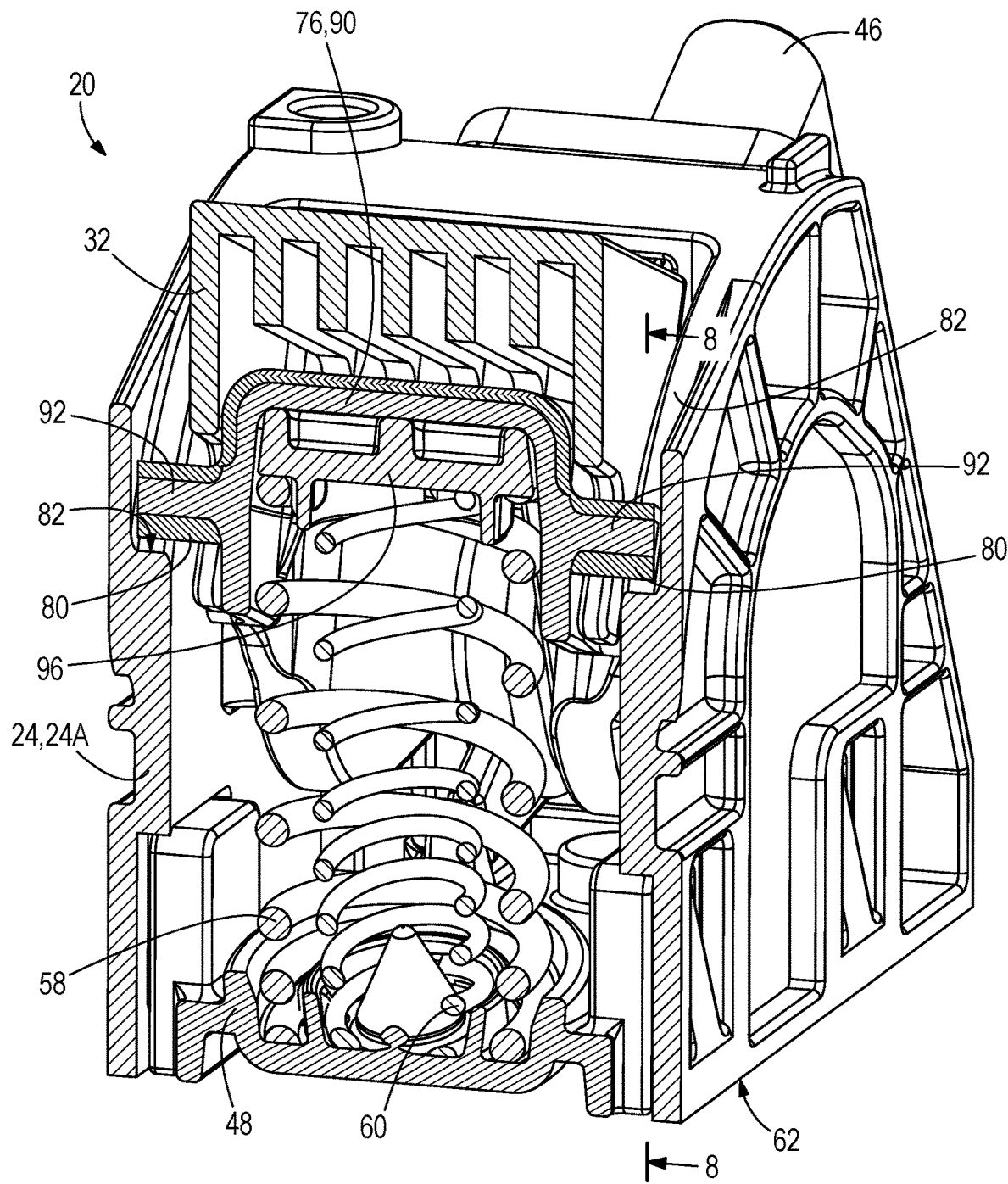
FIG. 7 is a cross-section view of the pedal assembly, taken along line 7-7 of FIG. 2.
Figure 8:
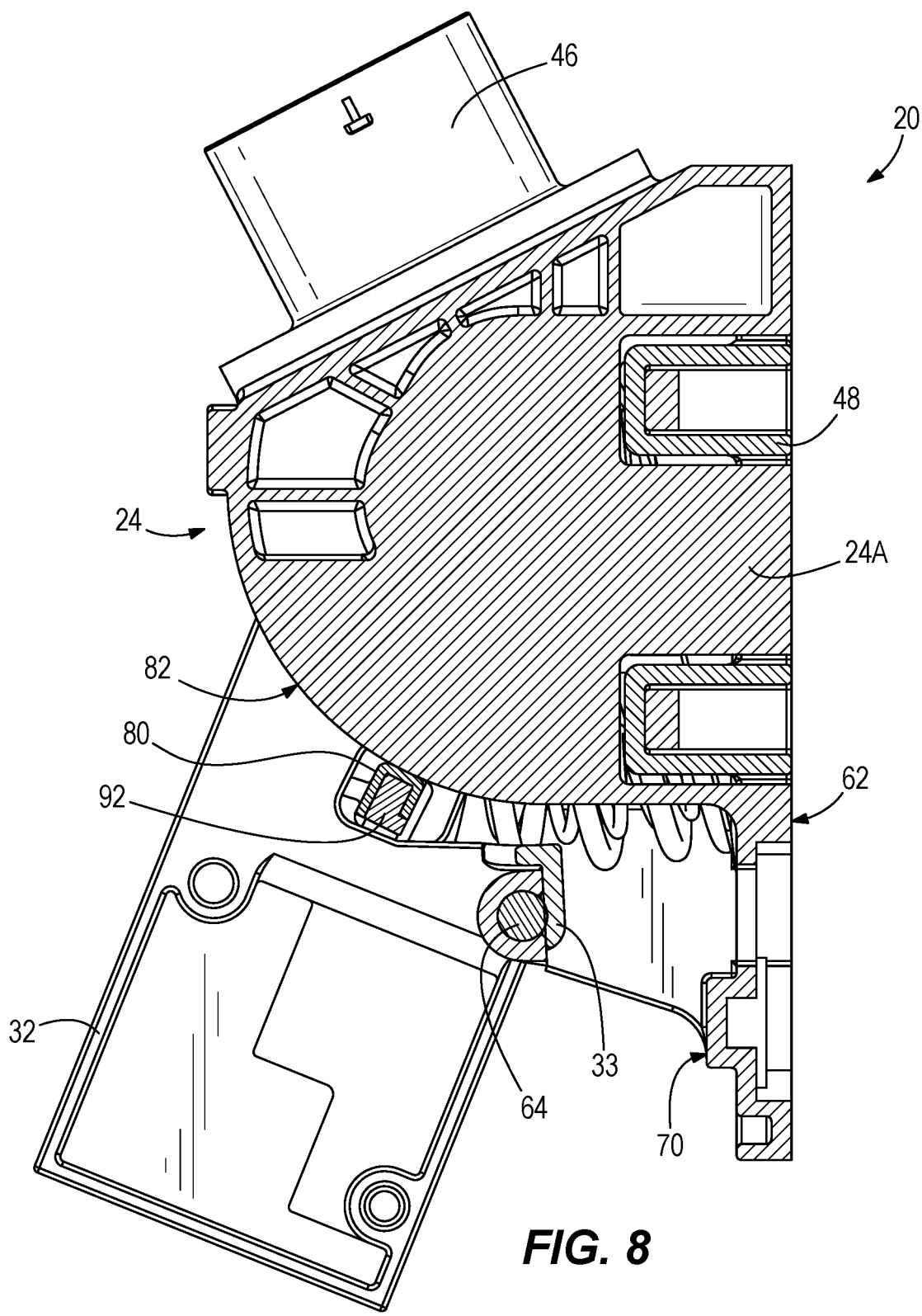
FIG. 8 is a cross-section view of the pedal assembly, taken along line 8-8 of FIG. 7.
Figure 9:
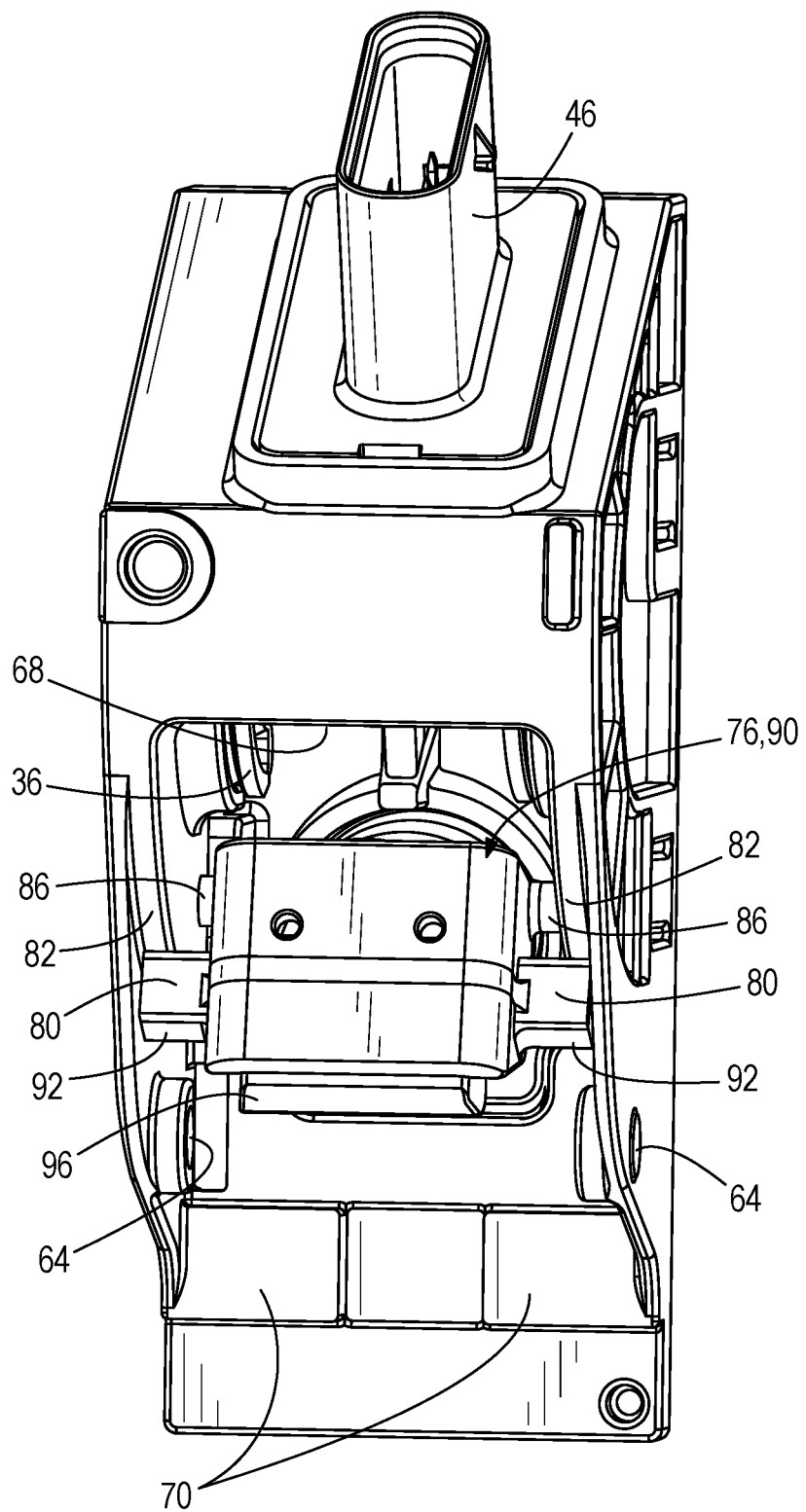
FIG. 9 is a perspective view of the pedal assembly with the pedal removed.

FIGS. 2 and 3 illustrate the pedal 32 in a first limit position, which is an unactuated or at-rest position (also "idle" position). The pedal 32 is biased to the first limit position by at least one spring (e.g., two concentric springs 58, 60). The spring(s) 58, 60 are positioned within the housing 24. The pedal 32, at least the distal portion thereof, is movable against the bias by actuation from the user in a forward direction F (FIGS. 1 and 2). The forward direction F is toward a side providing the mounting surface 62 of the housing 24, and the forward direction F can be perpendicular to a reference plane defined by the mounting surface 62 (although the mounting surface 62 itself may or may not be planar). The forward direction F is generally pointed in the direction of forward travel of the vehicle where the pedal assembly 20 is mounted to the bulkhead 28. The springs 58, 60 biasing the pedal 32 are supported and compressible between the pedal 32 and the closure member 48 of the housing 24. As shown in FIGS. 6 and 7, the closure member 48 can provide spring seats for positioning each of the springs 58, 60. Under the force of only the springs 58, 60 (no other force present from the user), a portion of the pedal 32 provided as a stop or ledge 33 as shown in FIG. 8 is urged into contact with a stop or bumper 64 of the housing 24. In the illustrated construction according to FIG. 9, two bumpers 64 are provided on opposite lateral sides of the main housing portion 24A. The bumpers 64 define the first limit position of the pedal 32 with respect to the housing 24. The pedal 32 is movable through an opening 68 (FIGS. 2 and 9) of the housing 24 from the first limit position to a second limit position or maximum-actuation (e.g., full throttle) position, which is not shown. The second limit position of the pedal 32 can be defined by contact between the pedal 32 and one or more stop surfaces 70 of the housing 24. As shown in FIG. 9, the main housing portion 24A may provide stop surfaces 70 divided into two or more pads with a space therebetween.

As mentioned briefly above, the pedal assembly 20 includes a friction system. The friction system includes a friction lever 76 having one or more friction pads 80 in contact for frictional engagement with one or more friction contact surfaces 82 of the pedal housing 24. At least a portion of each surface 82 can follow an arc centered at the pedal axis A. As the pedal 32 moves further from the first limit position, the bias force from the springs 58, 60 increases. The friction system operates to add friction (by increasing the normal force between the friction pad(s) 80 and the friction contact surface(s) 82) as the pedal 32 is moved further from the first limit position. In other words, the friction lever 76 is increasingly actuated directly in response to movement of the pedal 32 away from the first limit position and toward the second limit position. On the other hand, the friction lever relaxes the frictional resistance as the pedal 32 moves back toward the first limit position. Low friction in this initial area of the pedal travel ensures that the friction system does not interfere with the ability of the pedal 32 to return to the first limit position. Friction in the initial area of the pedal travel is also less of a driver fatigue concern as the driver is less likely to maintain a position of the pedal 32 for long periods of time near the first limit position.

The friction lever 76 is supported by the pedal 32 and pivots on the pedal 32, as opposed to the housing 24. The connection between the friction lever 76 and the pedal 32 defines a lever axis B about which the friction lever 76 pivots in relation to the pedal 32. In the illustrated construction, the pivot connection is constructed by two opposite and laterally-opposed hinge pins 86 of the friction lever 76 received in complementary receptacles 88 of the pedal 32 as shown in FIGS. 3 and 6. In FIG. 9 where the pedal 32 is removed, the hinge pins 86 are also visible. In other constructions, the hinge pins 86 and receptacles 88 can be reversed such that the pedal 32 includes the hinge pins. As can be seen from FIGS. 3, 6, and 7, the friction lever 76 is partially or completely nested into the pedal 32, which includes a hollowed cavity accommodating the friction lever 76.

FIG. 7 is a cross-section taken through the interfaces where the friction pads 80 engage the friction contact surfaces 82 of the pedal housing 24. FIGS. 8 and 9 also provide a clear view of these interfaces. The friction pads 80 can be formed at opposite laterally-opposed sides of a main body 90 of the friction lever 76. The friction pads 80 can be formed on laterally-projecting portions 92 of the main body 90. Though not required in all embodiments, the friction pads 80 can be formed of a separate material distinct from a material forming the main body 90 of the friction lever 76. The main body 90 can be a glass-filed resin (nylon) and the friction pads 80 can be an unfilled lubricated POM (acetal). In some constructions, the friction pads 80 are overmolded onto the main body 90 to form the friction lever 76. In a construction with the two laterally-projecting portions 92, like that illustrated, the two spaced-apart friction pads 80 can be molded in a continuous piece having a central connecting strip that spans the main body 90 (FIGS. 4 and 9).

As noted above, the friction lever 76 is nested into the pedal 32. Furthermore, the friction lever 76 can be saddle-shaped (FIG. 6), including a top wall and two lateral walls. A cavity for partially receiving the springs 58, 60 is provided in the friction lever 76, below the top wall and between the lateral walls. The lateral walls, via the hinge pins 86 formed thereon in the illustrated construction, establish the pivotal connection to the pedal 32. A spring cap 96 is situated between the top wall of the friction lever 76 and the springs 58, 60. As such, the springs 58, 60 do not directly contact the friction lever 76. The spring cap 96 establishes a sliding interface with the interior side of the friction lever top wall, which largely or completely limits the springs 58, 60 to transmitting forces on-axis, rather than off-axis in bending. The spring cap 96 can have a shape complementary to the ends of the springs 58, 60 for maintaining positioning thereof.

Figure 10:
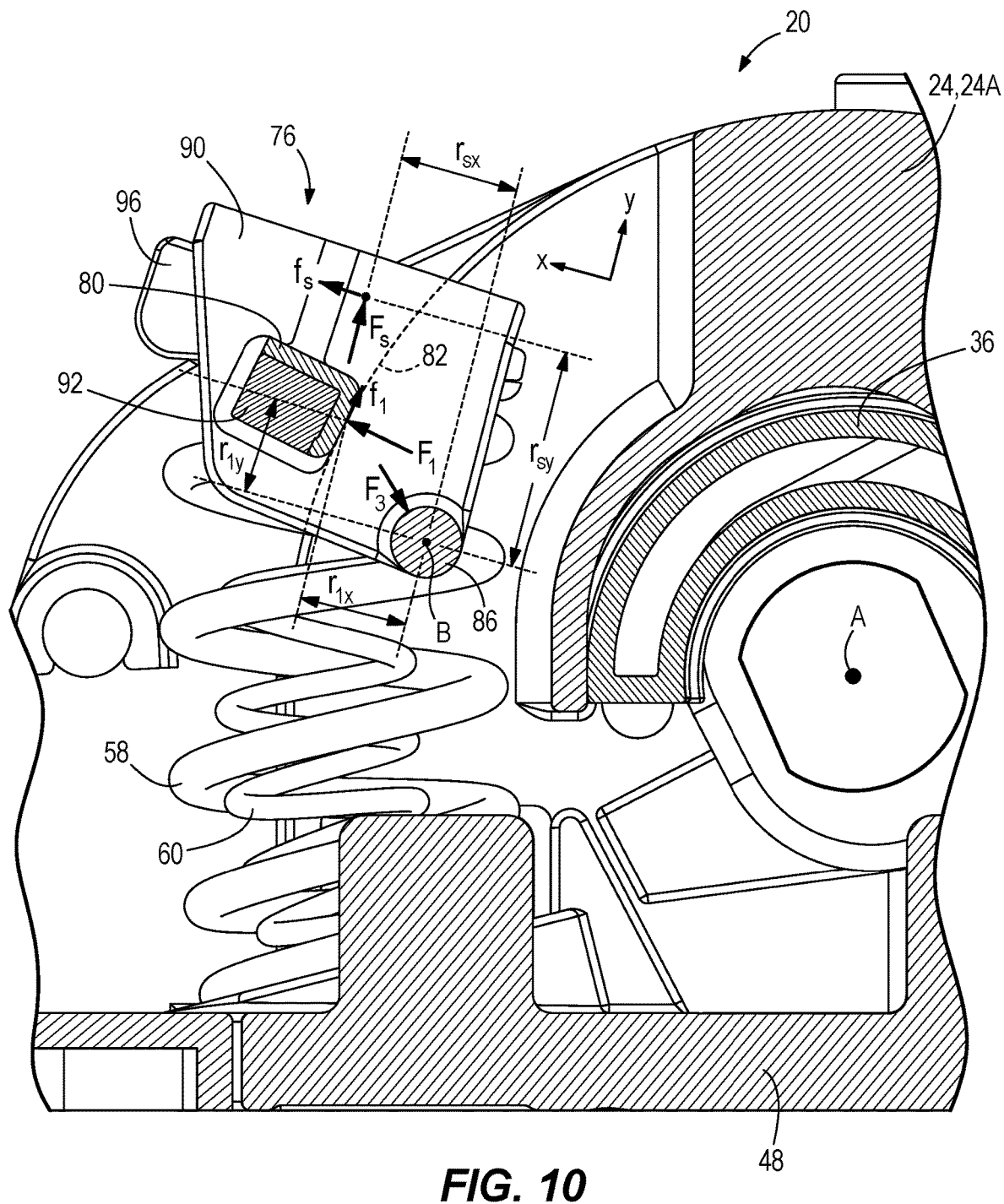
FIG. 10 is a free body diagram of the friction lever of the friction system.

FIG. 10 is a cross-section of the pedal assembly 20 labeled as a free body diagram for the forces on the friction lever 76. A coordinate system is used where the x-direction runs parallel to the planar interface between the spring cap 96 and the inside of the friction lever 76. The y-direction is perpendicular to the x-direction as shown. Although the parts themselves have depth into the page, the free body diagram is resolved to a 2-dimensional system as any forces acting into/out of the page are negligible. The springs 58, 60 generate and apply a force $F_S$ (through the spring cap 96) to the underside of the friction lever 76. The force $F_S$, which varies as a function of pedal position and thus spring deflection, is parallel to the y-direction and perpendicular to the x-direction. At this same point, a perpendicular friction force $f_S$ may be applied, though very small or negligible. The forces $F_S$, $f_S$ act at respective moment arm distances $r_{SX}$ and $r_{SY}$ from the pivot axis B established between the friction lever 76 and the pedal 32. As shown in FIG. 10, the force generated from the springs 58, 60, namely $F_S$, imparts a clockwise moment to the friction lever 76 about the pivot axis B. This urges the friction pads 80 against the housing surfaces 82 with a force (not shown) directed toward the axis A of the pedal pivot 36 due to the configuration of the surfaces 82. Of course, increased spring force $F_S$ leads to an increase in the force applied from the friction pads 80 to the surfaces 82. The surfaces 82 react on the friction lever 76 with a force $F_1$ normal to the surface 82. Based on the friction coefficient, the force $F_1$ leads to a friction force $f_1$ that is tangential to the surface 82 (and thus tangential to a radial line that extends from the pedal axis A to the point of contact). The friction force $f_1$ is responsible for resisting movement of the pedal 32. Depending on the direction of pedal movement, the friction force $f_1$ can act on the pedal 32 in combination with the spring force (as drawn, during pedal actuation) or against the spring force (during pedal release). The forces $F_1$, $f_1$ act at respective moment arm distances $r_{1X}$ and $r_{1Y}$ from the pivot axis B established between the friction lever 76 and the pedal 32. Finally, the pedal 32 reacts with a force $F_3$ on the friction lever 76. The force $F_3$ is directed through the pivot axis B (on the hinge pin 86) and thus has no moment arm, or a moment arm length of zero.

From inspection of FIG. 10, it can be seen that the various moment arms for the spring force and the resulting friction $f_1$ at the friction pads 80 lead to an amplification of the effects of the spring force $F_S$. In other words, the values of the moment arm lengths $r_{1X}$ and $r_{1Y}$ are shorter than the moment arm lengths $r_{SX}$ and $r_{SY}$. This leads to a particular lever ratio, which is specific to the physical construction of the friction lever 76, e.g., the placement of the wall that receives the spring cap 96 in relation to the placement of the friction pads 80 and the placement of the pivot axis B (through hinge pins 86). The effective lever ratio, and thus amount of amplification from spring force to friction force, can be manipulated as part of the design to achieve different goals. Thus, the invention is not limited to the exact shape and effective ratios of the illustrated embodiment.

As mentioned briefly above, the pedal assembly 20 having the friction system disclosed herein can provide a very compact, lightweight product for mass production passenger vehicles or other special purpose vehicles. In some constructions, the offset distance X between the pedal arm pivot axis A and the mounting surface 62 is less than 26 mm, and in some constructions less than 25 mm. The offset distance X can be greater than or equal to 10 mm, and in some constructions greater than or equal to 20 mm or greater than or equal to 24 mm.

Various features and advantages of the invention are set forth in the following claims.

What is claimed is:

1. A vehicular pedal assembly comprising:
   a pedal housing including a mounting surface on a forward side for securement within a vehicle;
   a rotatable pedal having a proximal portion positioned in the pedal housing and a distal portion including a foot pad spaced from the pedal housing, wherein the pedal is biased to a first limit position with respect to the pedal housing, and the distal portion is configured to be actuated from the first limit position in a forward direction; and
   a friction system for generating a resistance force against movement of the pedal toward and away from the first limit position,
   wherein the friction system includes a friction lever having a friction pad, the friction lever being carried by the pedal and pivotable on the pedal to establish friction contact with a friction contact surface of the pedal housing, and
   wherein a central portion of the friction lever is nested into a hollow cavity of the pedal.

2. The vehicular pedal assembly of claim 1, wherein a portion of the friction contact surface is an arcuate surface centered at a pivot axis of the pedal such that the friction lever is configured to apply a force to the friction contact surface of the pedal housing in a direction toward the pivot axis of the pedal.

3. A vehicular pedal assembly comprising:
   a pedal housing including a mounting surface on a forward side for securement within a vehicle;
   a rotatable pedal having a proximal portion positioned in the pedal housing and a distal portion including a foot pad spaced from the pedal housing, wherein the pedal is biased to a first limit position with respect to the pedal housing, and the distal portion is configured to be actuated from the first limit position in a forward direction; and
   a friction system for generating a resistance force against movement of the pedal toward and away from the first limit position,
   wherein the friction system includes a friction lever having a friction pad, the friction lever being carried by the pedal and pivotable on the pedal to establish friction contact with a friction contact surface of the pedal housing,
   wherein the friction lever is saddle-shaped and includes a pair of spaced lateral walls with a spring cavity therebetween, wherein each of the pair of spaced lateral walls is pivotally coupled to the pedal.

4. A vehicular pedal assembly comprising:
   a pedal housing including a mounting surface on a forward side for securement within a vehicle;
   a rotatable pedal having a proximal portion positioned in the pedal housing and a distal portion including a foot pad spaced from the pedal housing, wherein the pedal is biased to a first limit position with respect to the pedal housing, and the distal portion is configured to be actuated from the first limit position in a forward direction; and
   a friction system for generating a resistance force against movement of the pedal toward and away from the first limit position, wherein the friction system includes a friction lever having a friction pad, the friction lever being carried by the pedal and pivotable on the pedal to establish friction contact with a friction contact surface of the pedal housing, the vehicular pedal assembly further comprising a spring cap, the spring cap having a first side engaged with at least one spring to maintain position thereof, the spring cap having a second side forming a sliding interface with the friction lever.

5. A vehicular pedal assembly comprising:
a pedal housing including a mounting surface on a forward side for securement within a vehicle;
a rotatable pedal having a proximal portion positioned in the pedal housing and a distal portion including a foot pad spaced from the pedal housing, wherein the pedal is biased to a first limit position with respect to the pedal housing, and the distal portion is configured to be actuated from the first limit position in a forward direction; and
a friction system for generating a resistance force against movement of the pedal toward and away from the first limit position,
wherein the friction system includes a friction lever having a friction pad, the friction lever being carried by the pedal and pivotable on the pedal to establish friction contact with a friction contact surface of the pedal housing, wherein a spring that acts to bias the pedal to the first limit position presses on the friction lever about a first point of contact, and the friction pad defines a second point of contact where it touches the friction contact surface of the pedal housing, and wherein the first point of contact is farther than the second point of contact from a pivot axis of the friction lever on the pedal such that the force from the spring is amplified according to a lever ratio of the friction lever in generating force from the friction pad to the friction contact surface of the pedal housing.

6. The vehicular pedal assembly of claim 1, wherein the pedal housing is a multi-piece housing including an electrical connector connected with a position sensor module that includes a non-contact sensor configured to track a position of the pedal.

7. The vehicular pedal assembly of claim 1, wherein the friction pad is overmolded onto a main body of the friction lever.

8. A vehicular pedal assembly comprising:
a pedal housing including a mounting surface on a forward side for securement within a vehicle;
a rotatable pedal having a proximal portion positioned in the pedal housing and a distal portion including a foot pad spaced from the pedal housing, wherein the pedal is biased to a first limit position with respect to the pedal housing, and the distal portion is configured to be actuated from the first limit position in a forward direction; and
a friction system for generating a resistance force against movement of the pedal toward and away from the first limit position,
wherein the friction system includes a friction lever having a friction pad, the friction lever being carried by the pedal and pivotable on the pedal to establish friction contact with a friction contact surface of the pedal housing, wherein an offset distance between the mounting surface and a pivot axis of the pedal is less than 26 mm.

9. The vehicular pedal assembly of claim 8, wherein an offset distance between the mounting surface and a pivot axis of the pedal is less than 25 mm.

10. An accelerator pedal assembly comprising:
mounting surface for securement within a vehicle;
an accelerator pedal including a foot pad, wherein the accelerator pedal is biased by a spring to a first limit position, and the foot pad is configured to be actuated from the first limit position in a forward direction; and
a friction system for generating a resistance force against movement of the accelerator pedal toward and away from the first limit position,
wherein the friction system includes a friction lever pivotally supported on the accelerator pedal,
wherein the spring applies a force to the friction lever such that the resistance force changes according to deflection of the spring, and
wherein a portion of the friction lever receiving the force from the spring is nested into a hollow cavity formed in the accelerator pedal.

11. The accelerator pedal assembly of claim 10, further comprising a pedal housing including the mounting surface, wherein, opposite the foot pad, the accelerator pedal includes a proximal portion positioned in the pedal housing and supported for rotation about a pedal axis.

12. The accelerator pedal assembly of claim 11, wherein the friction lever contacts a friction contact surface of the pedal housing with a force proportional to the force from the spring.

13. The accelerator pedal assembly of claim 12, wherein the friction lever is configured to amplify the force from the spring in applying force to the friction contact surface of the pedal housing.

14. The accelerator pedal assembly of claim 12, wherein a portion of the friction contact surface is an arcuate surface centered at the pedal axis such that the friction lever is configured to apply a force to the friction contact surface of the pedal housing in a direction toward the pedal axis.

15. The accelerator pedal assembly of claim 11, wherein the pedal housing is a multi-piece housing including an electrical connector connected with a position sensor module that includes a non-contact sensor configured to track a position of the accelerator pedal.

16. The accelerator pedal assembly of claim 10, wherein the friction lever includes at least one friction pad overmolded onto a main body of the friction lever.

17. An accelerator pedal assembly comprising:
mounting surface for securement within a vehicle;
an accelerator pedal including a foot pad, wherein the accelerator pedal is biased by a spring to a first limit position, and the foot pad is configured to be actuated from the first limit position in a forward direction; and
a friction system for generating a resistance force against movement of the accelerator pedal toward and away from the first limit position,
wherein the friction system includes a friction lever pivotally supported on the accelerator pedal,
wherein the spring applies a force to the friction lever such that the resistance force changes according to deflection of the spring,
wherein the friction lever is saddle-shaped and includes a pair of spaced lateral walls with a spring cavity therebetween, wherein each of the pair of spaced lateral walls is pivotally coupled to the accelerator pedal.

18. An accelerator pedal assembly comprising:
mounting surface for securement within a vehicle;

an accelerator pedal including a foot pad, wherein the accelerator pedal is biased by a spring to a first limit position, and the foot pad is configured to be actuated from the first limit position in a forward direction; and a friction system for generating a resistance force against movement of the accelerator pedal toward and away from the first limit position, wherein the friction system includes a friction lever pivotally supported on the accelerator pedal, wherein the spring applies a force to the friction lever such that the resistance force changes according to deflection of the spring, the accelerator pedal assembly further comprising a spring cap, the spring cap having a first side engaged with the spring to maintain position thereof, the spring cap having a second side forming a sliding interface with the friction lever.

19. An accelerator pedal assembly comprising:
mounting surface for securement within a vehicle;
an accelerator pedal including a foot pad, wherein the accelerator pedal is biased by a spring to a first limit position, and the foot pad is configured to be actuated from the first limit position in a forward direction; and a friction system for generating a resistance force against movement of the accelerator pedal toward and away from the first limit position, wherein the friction system includes a friction lever pivotally supported on the accelerator pedal, wherein the spring applies a force to the friction lever such that the resistance force changes according to deflection of the spring, wherein an offset distance between the mounting surface and a pivot axis of the accelerator pedal is less than 26 mm.

20. The accelerator pedal assembly of claim 19, wherein an offset distance between the mounting surface and a pivot axis of the accelerator pedal is less than 25 mm.

\* \* \* \* \*